United States Patent [19]
Herrmann et al.

[11] Patent Number: 5,262,771
[45] Date of Patent: Nov. 16, 1993

[54] METHOD FOR ADDRESSING PROCESSOR UNITS

[75] Inventors: Karl Herrmann, Eckental; Wilfried Hecht, Pegnitz; Erhard Steiner, Eichenau; Ferdinand Narjes; Guenter Weimert, both of Munich, all of Fed. Rep. of Germany

[73] Assignees: U.S. Philips Corporation, New York, N.Y.; Siemens Aktiengesellschaft, Munich, Fed. Rep. of Germany

[21] Appl. No.: 865,759

[22] Filed: Apr. 10, 1992

Related U.S. Application Data

[63] Continuation of Ser. No. 566,379, Aug. 27, 1990, abandoned.

[30] Foreign Application Priority Data

Mar. 3, 1988 [DE] Fed. Rep. of Germany ....... 3806948

[51] Int. Cl.$^5$ .............................................. H04Q 1/00
[52] U.S. Cl. ............................ 340/825.08; 340/825.5; 340/825.03; 340/825.07
[58] Field of Search ........................ 340/825.08, 825.07, 340/825.52, 825.02, 825.03, 825.5, 825.54

[56] References Cited

U.S. PATENT DOCUMENTS

| | | | |
|---|---|---|---|
| 3,693,155 | 9/1972 | Crafton et al. | 340/825.54 |
| 4,418,333 | 11/1983 | Schwarzbach et al. | 340/825.07 |
| 4,638,313 | 1/1987 | Sherwood, Jr. et al. | 340/825.52 |
| 4,677,611 | 6/1987 | Yanosy, Jr. et al. | 340/825.5 |
| 4,763,329 | 8/1988 | Green | 340/825.02 |
| 4,849,752 | 7/1989 | Bryant | 340/825.07 |
| 4,887,077 | 12/1989 | Irby, III et al. | 340/825.52 |
| 4,912,627 | 3/1990 | Ashkin et al. | 340/825.52 |
| 4,982,185 | 1/1991 | Holmberg et al. | 340/825.07 |

FOREIGN PATENT DOCUMENTS

| | | |
|---|---|---|
| 0143489A1 | 6/1985 | European Pat. Off. . |
| 0153015A3 | 8/1985 | European Pat. Off. . |
| 2823918 | 12/1979 | Fed. Rep. of Germany . |
| 2823925 | 12/1979 | Fed. Rep. of Germany . |

OTHER PUBLICATIONS

"Supervision and Additional Services for Digital Fiber-Optic Transmission Systems" by Braun et al, telcom report 10 (1987), Special Multiplexing and Line Transmission pp. 107-112.

*Primary Examiner*—Donald J. Yusko
*Assistant Examiner*—Brian Zimmerman
*Attorney, Agent, or Firm*—Hill, Steadman & Simpson

[57] ABSTRACT

In a method for addressing processor units of an equipment for monitoring and/or controlling, whereby a polling unit and processor units (6) provided with addresses exchange information, the processor units (6) are automatically addressed with the assistance of addressing telegrams in that an address contained in the addressing telegram is respectively incremented. The method can be advantageously used in equipment for in-service monitoring of equipment of communication transmission technology.

14 Claims, 8 Drawing Sheets

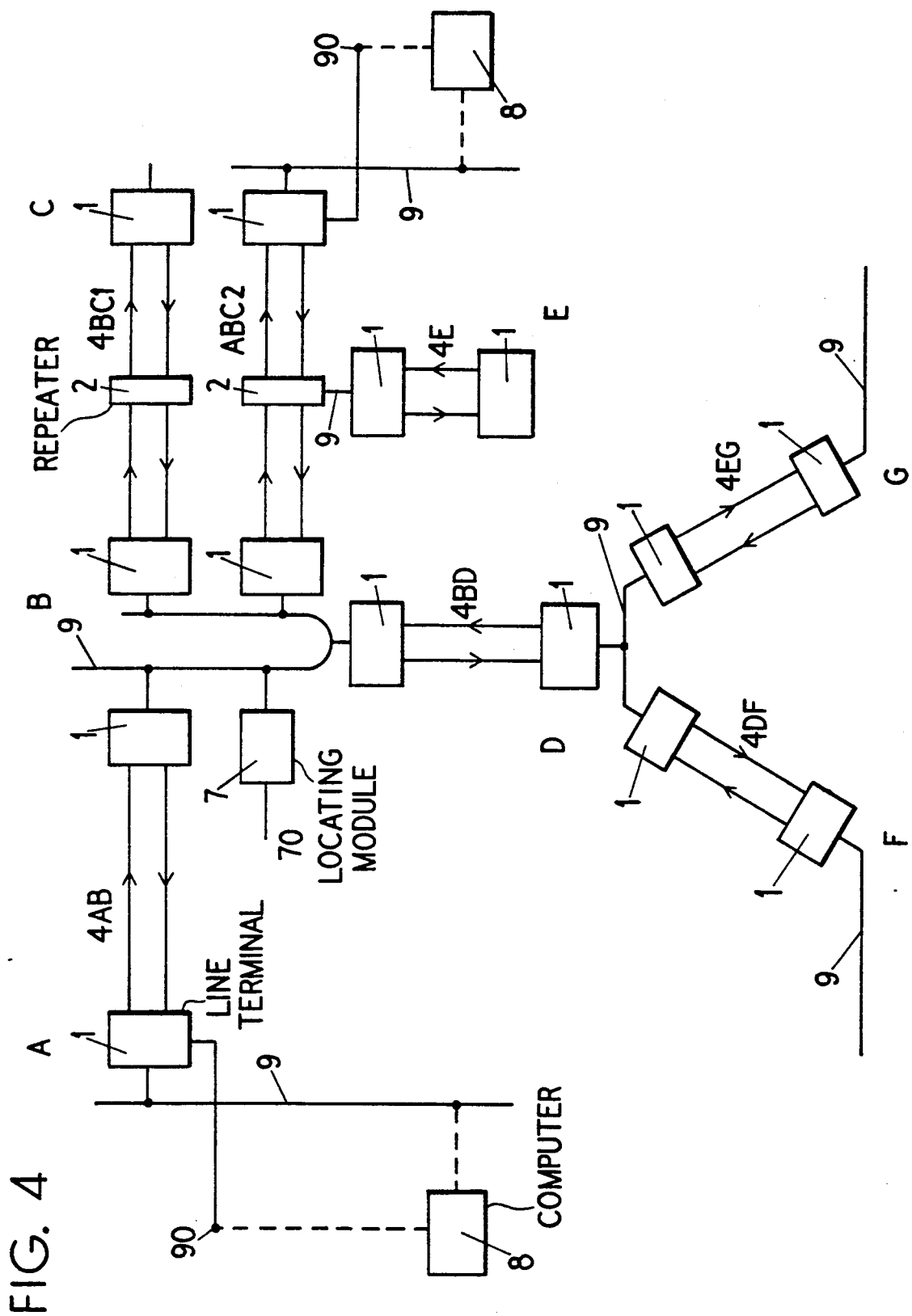

| S1 | 1 | 1 | 1 | 1 | 1 | 1 |
| S2 | 1 | 2 | 2 | 2 | 2 | 2 |
| S3 | 1 | 2 | 3 | 3 | 3 | 3 |

| Sn | 1 | 2 | 3 | 4 | n | n |
| S  | 1 | 2 | 3 | 4 | n+1 | n+2 |

5,262,771

METHOD FOR ADDRESSING PROCESSOR UNITS

This is a continuation of application Ser. No. 566,379, filed Aug. 27, 1990, now abandoned.

BACKGROUND OF THE INVENTION

The invention is directed to a method for addressing processor units serving the purpose of monitoring and/or controlling a communication transmission equipment, whereby at least one monitoring unit and processor units provided with addresses that belong to local ends and/or intermediate locations of a communication transmission equipment exchange information with one another via a telegram transmission network containing at least one in-service monitoring channel of a transmission section such in normal operation that polling telegrams of the monitoring unit and reply telegrams of the processor units that contain monitoring data are transmitted, and is also directed to a circuit arrangement for the implementation of the method.

Such methods are already disclosed by German Published Application 28 23 925. In the known methods, the addresses are set with the assistance of coding switches or are defined by a specific lack wiring.

A method for in-service monitoring of a communication transmission equipment, whereby useful signals are transmitted via an electrooptical transmission link and telemetry signals are transmitted via an auxiliary channel, is already known from Ewald Braun and Erhard Steiner, Supervision and Additional Services for Digital Fiber-Optic Transmission Systems, telecom report 10 (1987) Special Multiplexing and Live Transmission, pages 107 through 112.

The known method employs address-free telemetry telegrams, so that the processor units provided in the line terminal equipment and intermediate repeaters of a transmission section need not be addressed. The method, however, cannot be applied without further ado in communication transmission equipment that have a star or, respectively, tree structure. When processor units are provided in the telegram transmission network of the appertaining telemetry means in a communication transmission network having star or, respectively, tree structure, these processor units being called under address control in cyclical succession by a locating unit, then a structure corresponding to the useful signal network can in fact also be provided for the telegram signal network of the telemetry means. The problem thereby arises, however, that the processor units must be respectively set to a defined address and this must be undertaken not only upon initialization of the telemetry means but also at every modification of the communication transmission equipment that requires a re-addressing of the processor units.

This problem also arises, for example, when branched equipment for distributing electrical energy or the like are to be monitored with the assistance of a remote control means.

SUMMARY OF THE INVENTION

It is therefore an object of the invention to specify a method and a circuit arrangement for the implementation of this method that allow processor units to be automatically addressed. In particular, it should thereby be possible to automatically address devices having processor units for an in-service monitoring of communication transmission links, preferably digital signal transmission links.

In particular, a method for in-service monitoring according to the polling method that offers the possibility of a central monitoring of digital signal transmission networks having line, branching and/or star structure should additionally offer the advantages of a self-addressing of the entire network, so that an involved and error-intensive, manual presetting of addresses is eliminated.

For achieving this object, the method of the invention provides the method steps as follows: the processor units are provided with individual addresses in that a processor unit connected to one of two ends of the respective transmission section and serving as addressing unit in the addressing mode outputs an addressing telegram to the appertaining transmission section, this addressing telegram containing an addressing telegram identifier and an address; and the processor units of the transmission section forward the addressing telegrams and/or a new addressing telegram to the following processor units after an incrementation of the address contained in the addressing telegram; and the processor unit of the transmission section respectively stores the address of the received or transmitted addressing telegram as its own address. An expedient circuit arrangement for the implementation of the method comprises a processor unit serving as addressing unit in the addressing mode connected to one of two ends of the respective transmission section. The processor unit contains a means for outputting addressing telegrams. The processor units of the transmission section contain a means for forwarding the addressing telegrams and/or new addressing telegrams, contain a means for incrementing the address contained in a received addressing telegram and containing an address memory for storing the address of the received or transmitted addressing telegram.

The method of the invention and the circuit arrangement for the implementation of the method advantageously allow processor units that are connected to one another via a star-shaped or, respectively, tree-shaped telegram transmission network to be automatically set to various addresses in an especially simple way. A transmission section is thereby particularly formed by a fundamental digital signal line section.

Advantageous developments of the invention are as follow. In the method of the present invention the processor units through-connect the addressing telegrams and subsequently additionally transmit the new addressing telegrams. Alternatively, the processor units do not forward addressing telegrams received in the addressing mode but only forward the new addressing telegram to the next processor unit. The telegram transmission network can have a plurality of transmission sections with the addresses of the processor units having a first sub-address for the respective transmission section and a second sub-address for the ordering number of the processor unit in the transmission section. The processor units increment only the second sub-address before the forwarding of the new addressing telegram. Given a plurality of transmission sections connected in chain, the processor unit that is situated at that end of the transmission section lying opposite the addressing unit or the first processor unit of the following transmission section increments both the first as well as the second sub-address. Given a plurality of transmission sections connected in chain, the processor unit that is situated at that end of the transmission section lying opposite the addressing unit or the first processor unit of the following transmission section increments the first sub-address and resets the second sub-address to an initial value (001).

The telegram transmission network can be a network having star-branch structure composed of a plurality of line networks each respectively containing at least one transmission section. Addressing units situated at the network nodes are respectively pre-set to a given address in the first address part and, given reception of a start-addressing telegram, output an addressing telegram that is the pre-set address of the appertaining transmission section in the first address part and is its own ordering number in the appertaining transmission section in the second address part. Furthermore, after the reception of an addressing telegram via the cascade, processor units situated at the network nodes can be set to an address by the first address part and, given reception of a start-addressing telegram, output an addressing telegram that is the set address of the appertaining transmission section in the first address part and is its own ordering number in the appertaining transmission section in the second address part.

When plugging the appertaining component, the processor units can be switched into a condition wherein they transmit a request telegram during a time slot respectively provided following the polling cycle, as a result whereof the respectively at located addressing unit is initiated to send out and addressing telegrams.

Given the replacement of a processor unit that is not an addressing unit, the polling unit is initiated by a request telegram to lend the time slot a duration adequate for the addressing procedure. The processor unit is fashioned such, in a first operating mode (normal mode), it through-connects telegrams and, in a second operating mode (store-and-forward mode), does not forward telegrams until after a storing, particularly after a processing.

It can be provided that the addressing
units respectively transmit a new addressing telegram upon receipt of an addressing telegram. In comparison thereto, an especially fast execution of the addressing procedure derives when the processor unit that is situated at that end of the transmission section lying opposite the addressing unit or the first processor unit of the following transmission section increments the first sub-address and resets the second sub-address to an initial value.

BRIEF DESCRIPTION OF THE DRAWINGS

The invention shall be set forth in greater detail with reference to the exemplary embodiments shown in the figures.

Shown are:

FIG. 4 a branched star network;

DESCRIPTION OF THE PREFERRED EMBODIMENT

Figure 1:
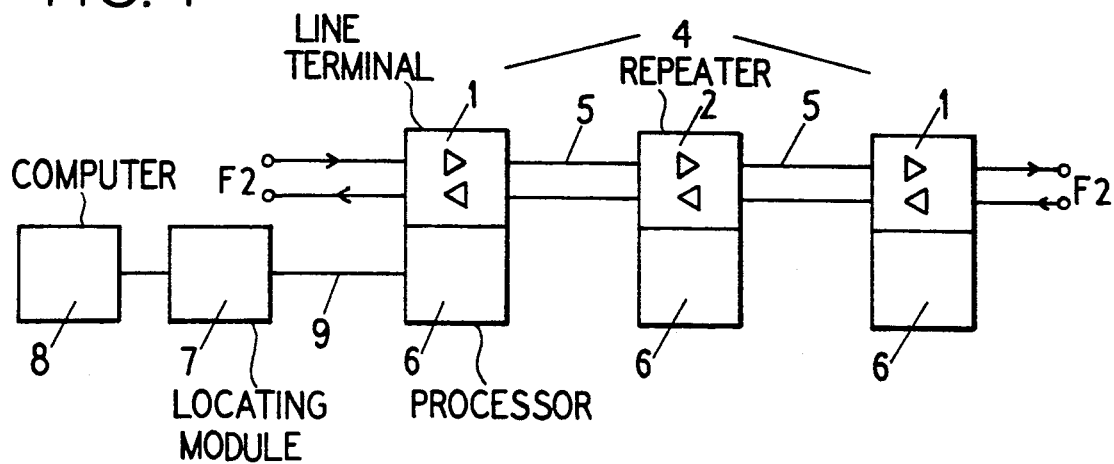
FIG. 1 a fundamental digital signal line section.

Line terminal equipment, intermediate repeaters and light waveguides are the basic elements of the digital signal transmission link shown in FIG. 1 whose functionability of transmission properties are to be monitored with the assistance of devices of a means for in-service monitoring composed of the locating module 7, of the personal computer 8 and of the in-service monitoring processor units referred to below as processor units 6.

The locating module can be omitted when the processor units 6 are executed such that they can be connected as master or as slave. One processor unit 6 must then be connected as master and assumed the jobs of the locating module and the remaining processor units must be connected as slaves.

The smallest unit of a digital signal transmission link is a fundamental digital signal line section referred to below as line section 4. In the transmission means of FIG. 1, the line section is composed of two line terminal equipment 1 and of one or more intermediate repeaters 2 inserted into the link as needed.

A processor unit 6 that respectively receives the monitoring data of the main system to be monitored via an internal bus is introduced into every line terminal equipment 1 and into every intermediate repeater 2.

Figure 3:
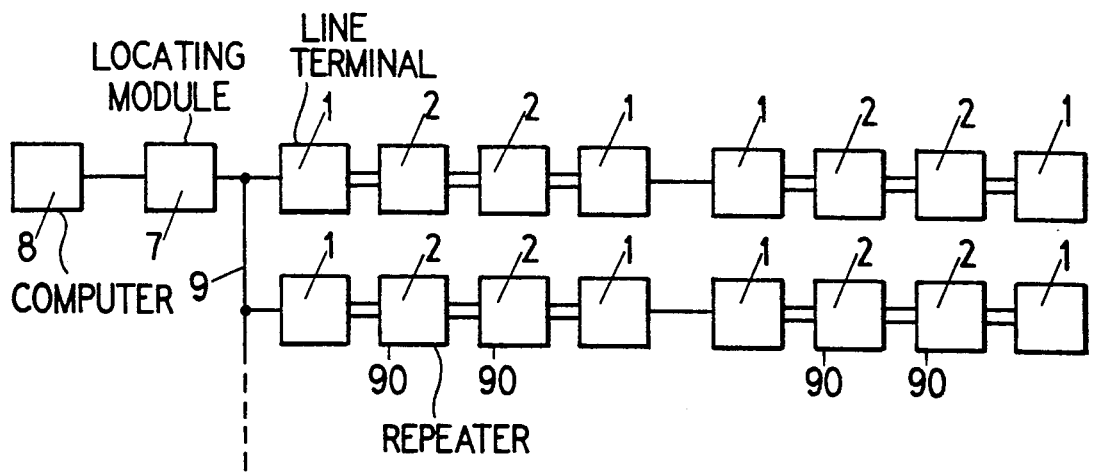
FIG. 3 a star network containing a plurality of parallel lines.
Figure 2:
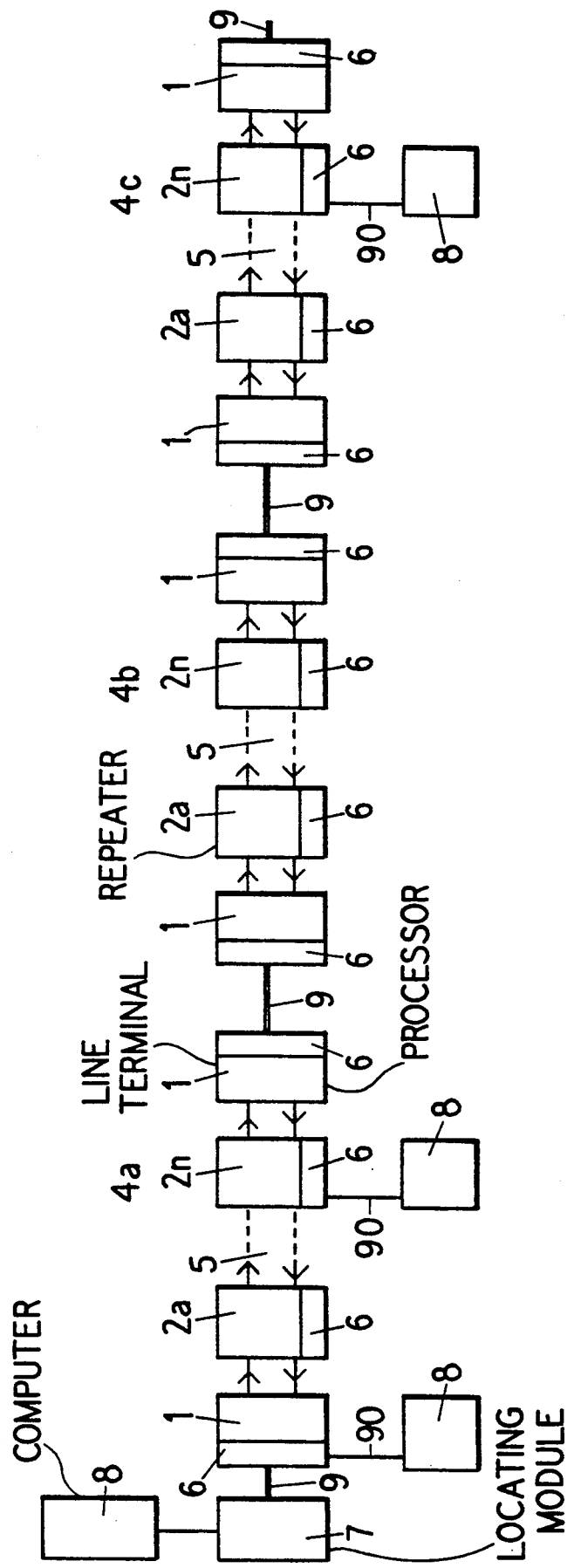
FIG. 2 a line network composed of three fundamental digital signal line section.

Dependent on the demands, the locating domain can be composed of the following structures:

of a line that, corresponding to FIG. 1 or, respectively, FIG. 2, is composed of one or more line sections connected in chain;

Corresponding to FIG. 3, of a network having a plurality of parallel lines:

according to FIG. 4, of a star network provided with branchings.

Figure 7:
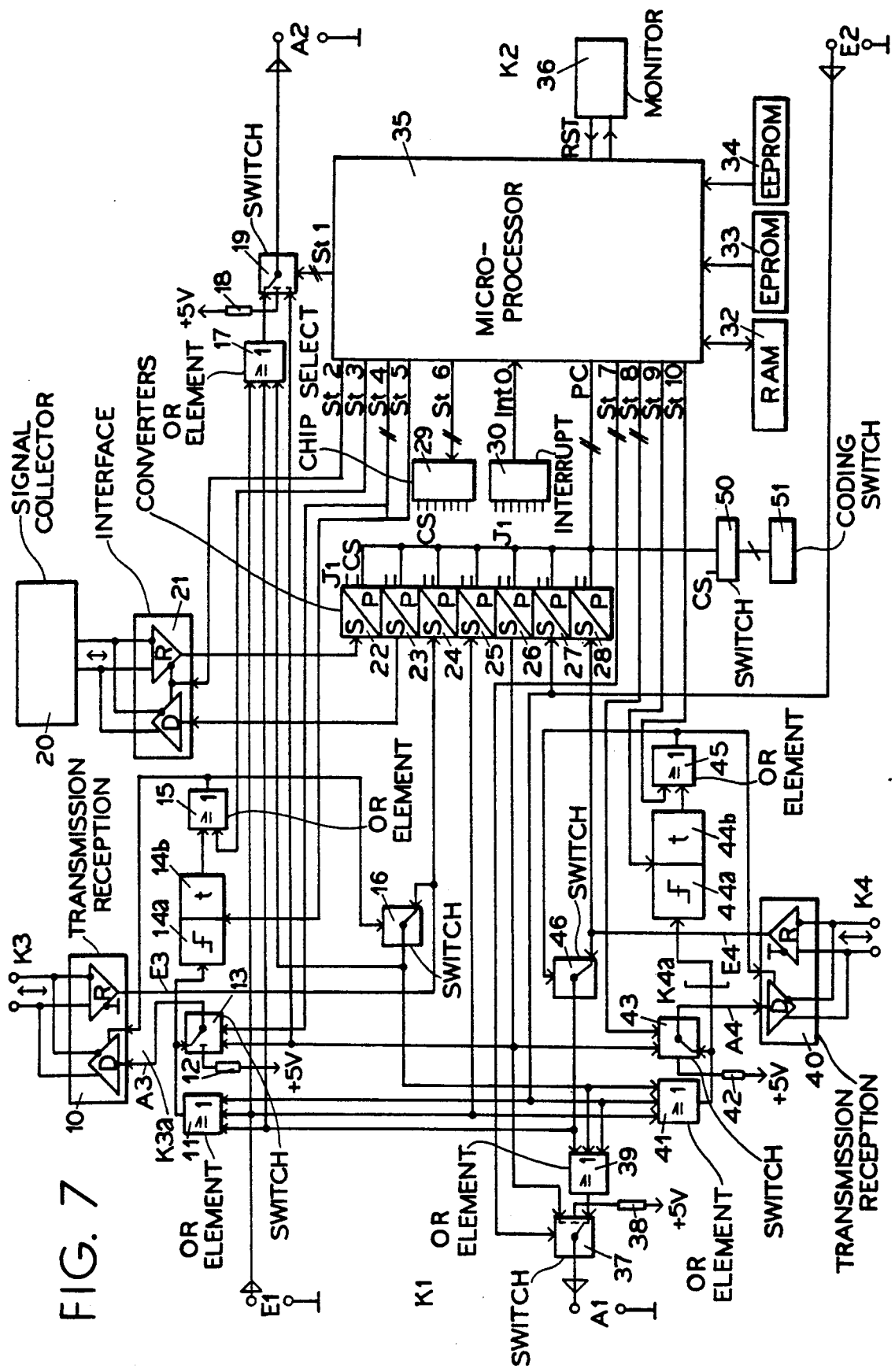
FIG. 7 a block circuit diagram of a versatily employable processor unit.
Figure 8:
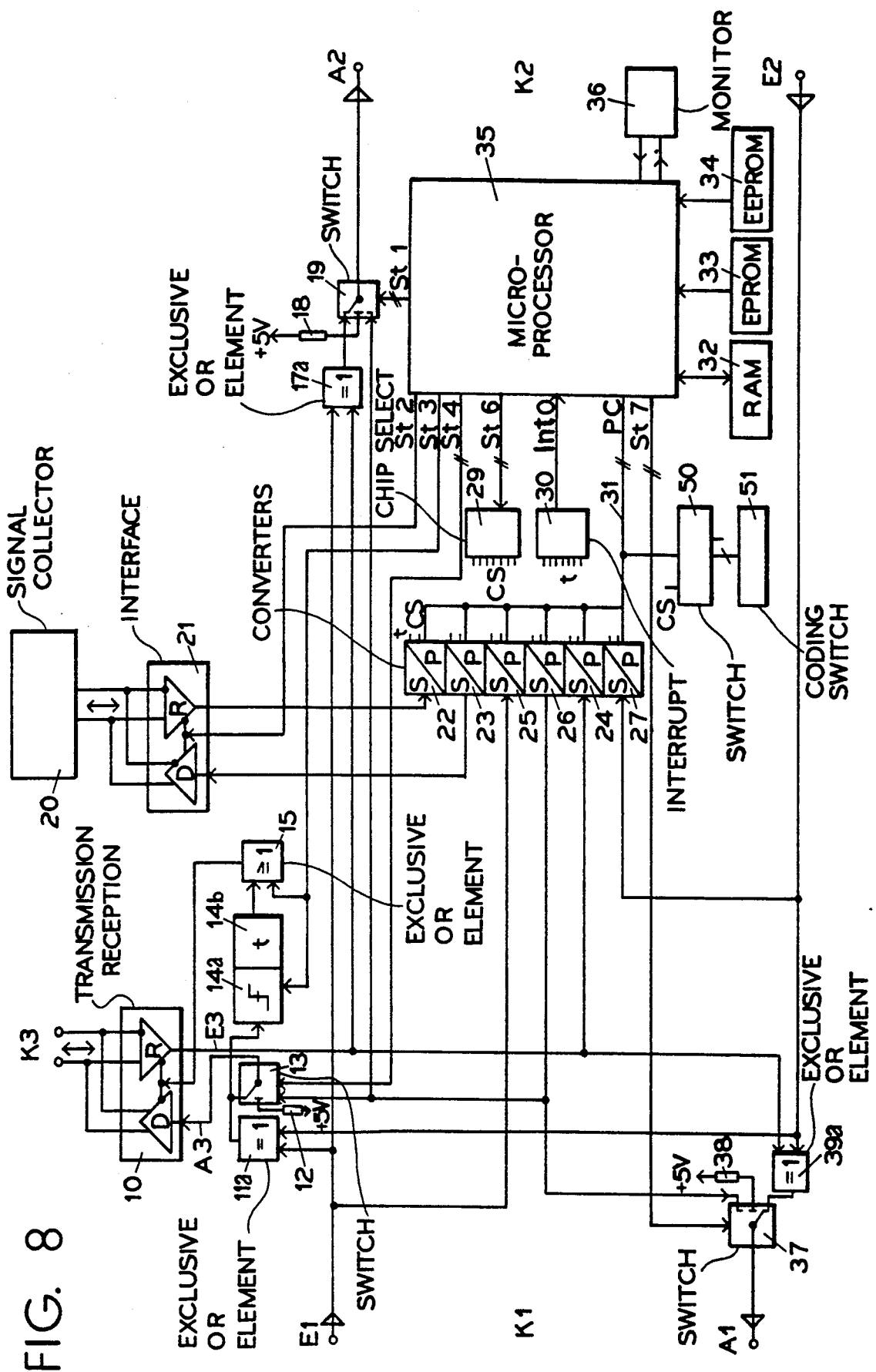
FIG. 8 a block circuit diagram of a processor unit having a bus terminal.
Figure 9:
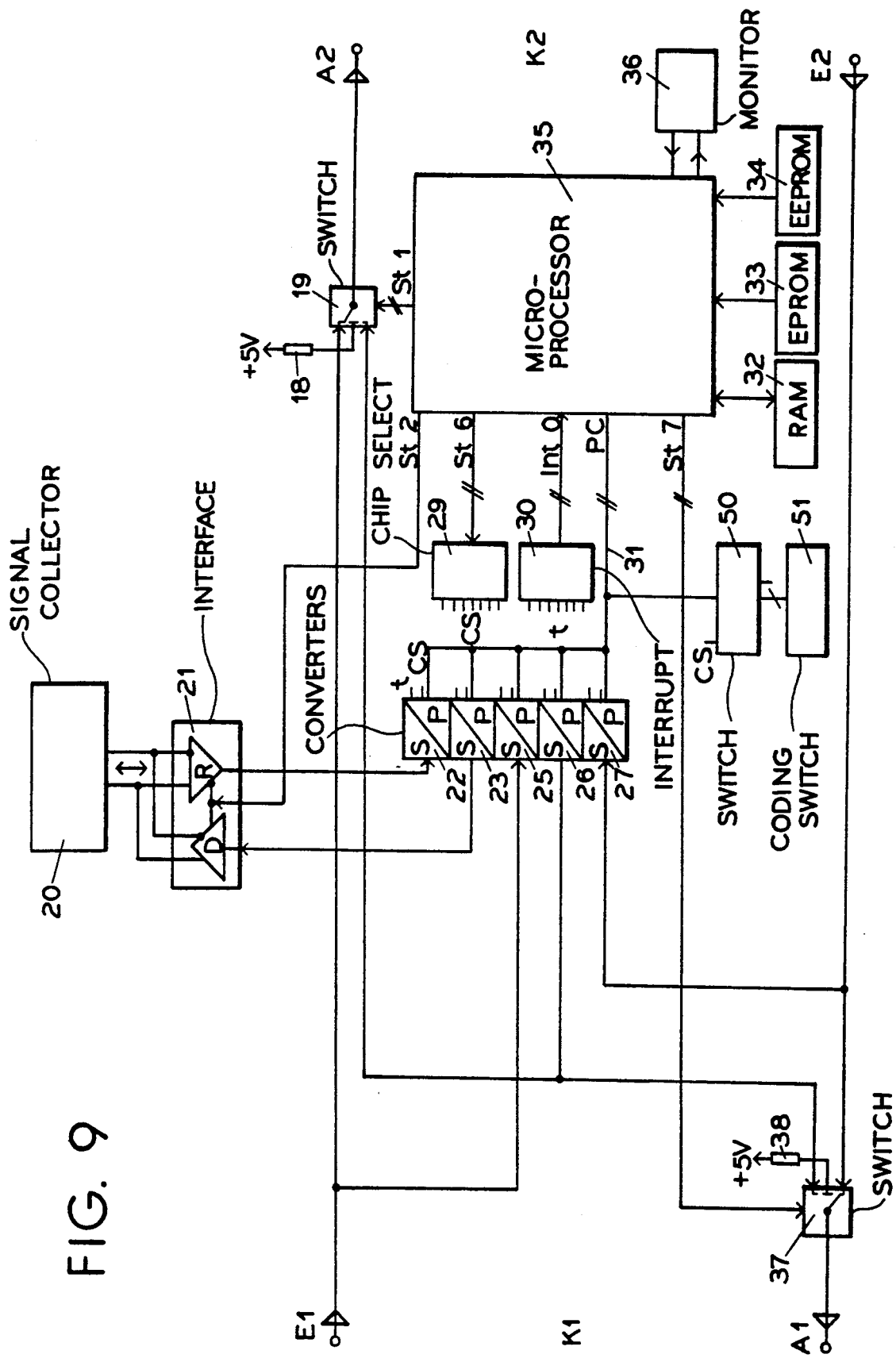
FIG. 9 a processor unit constructed in accord with FIG. 8 but without a bus terminal.

Every processor unit 6 is controlled by a microprocessor and is constructed in conformity with FIGS. 7 through 9. It has a terminal K2 in the line terminal equipment I and has two terminals K1 and K2—respectively one for each of the two directions—in the intermediate repeater 2 for in-coupling and out-coupling in an auxiliary channel superimposed on the useful signal. In addition, a terminal K3 or, respectively, K3$a$ for a network node or two terminals K3, K4 or, respectively, K3$a$, K4$a$ for a cascade circuit can be provided.

Dependent on the application, the terminal K3$a$ or the terminals K3$a$, K4$a$ having two unidirectional interfaces or the terminal K3 or the terminals K3, K4 having a bidirectional interface are employed. The data of the processor units 6 are respectively coupled out within a line section 4 via the terminals K1, K2 and are transmitted in an auxiliary channel that is preferably superimposed on the useful signal.

Within a line, the data of the processor units 6 from line terminal equipment 1 to line terminal equipment 1 are coupled into and out of the auxiliary channel via the four-wire terminals K1, K2 and may potentially be transmitted from one line section 4$a$ to the next line section 4$b$ via the terminals K3 or, respectively, K3$a$.

In the arrangement shown in FIG. 2, the line sections 4a...4c are connected in chain. The locating module 7 is connected to the processor unit 6 of the line terminal equipment 1 in one of the two local ends of the chained circuit. A personal computer 8 is connected to this locating module 7. Further personal computers 8 are directly connected to the processor unit 6 of the first line terminal equipment 1 and to two of the intermediate repeaters 2n.

Useful signals are transmitted from line terminal equipment 1 to line terminal equipment 1 within the line sections 4a...4c. The data of the processor units 6 are transmitted within the line sections 4a...4c via a respective auxiliary channel and are transmitted between the line sections 4a...4c via a respective ISM bus (in-service monitoring bus) 9 having the interface RS 485 (terminal K3 of the processor unit 6).

All processor units 6 additional have a terminal 90, particularly having the interface RS 232 C, to which a personal computer 8 can be connected. This possibility is utilized at a line terminal equipment and at two intermediate repeaters.

FIG. 3 shows two of a plurality of lines ending at the network node N (branching).

The processor units of the line terminal equipment 1 and the locating module 7 are connected to one another at the network node N via the ISM bus 9 (terminal K3 of the processor unit 6).

According to FIG. 4, the locations A through G are connected to one another via a branched star network. One line section 4AB without intermediate repeater is provided between the locations A and B; two line sections 4BC1, 4BC2 each having an intermediate repeater 2 are provided between the locations B and C; a line section 4BD is provided between the location B and the location D and a respective line section 4DF and 4DG is provided between the location D and F and the location D and G. The location E is also connected to the intermediate repeater 2 of the line section 4BC2 via a line section 4E.

A respective personal computer 8 is connected to the processor unit of the line terminal equipment 1 at the locations A and C. The personal computer 8 can thereby optionally ensue [sic] at the ISM bus 9 having the interface RS 485 or at an additional terminal of the processor unit having the interface RS 232 C. In addition to the line terminal equipment 1 of the line sections ending thereat, the locating module 7 is also connected to the ISM bus 9 at the location B, this locating module 7 being provided with a means for polling control. The locating module 7 additionally has a terminal 70 for the connection of a signal collecting means via which the monitoring data of the star network can be called in by the locating module 7 on the basis of the signal collecting means.

Given a branching, the data of the processor units 6 are transmitted between the line terminal equipment 1 via the terminals K3 or, respectively, K4 and via a network node.

In the networks of FIGS. 1 through 4, a means for executive sequencing, particularly a locating module 7 and/or a personal computer 8 is connected to one of the network nodes or to one of the processor units. The locating module 7 or a personal computer 8 successively polls the individual processor units 6 with a calling telegram with their addresses, receives their monitoring data by reply telegram and evaluates the latter.

In the method for in-service monitoring set forth below, the locating telegrams are asynchronously transmitted with a standard protocol according to IEC TC 57. Other protocols, for example CCITT X25 (HDLC format) are also possible for the transmission of the telegrams. In the master function, the locating module queries the processor units of the entire network.

The addressing of the devices is hierarchically constructed. One byte is provided for the addressing of line sections; one byte is provided for the addressing of the units formed by line terminal equipment and intermediate repeaters within a line section. The first octet of the address field contains the address of the line section; the second octet contains the device address, i.e. the address of the line terminal equipment or, respectively, of the intermediate repeater.

All addresses shall be recited in decimal form below and are binarily coded in the telegram.

The line terminal equipment of a line section close to the locating module is given the function of what is referred to as an addressing line terminal equipment.

The job of the addressing line terminal equipment is to initiate the self-addressing procedure within the appertaining line section. The addressing line terminal equipment receives the request to start the self-addressing procedure either by transmitting a start-addressing telegram by the locating module given initialization of the overall network;

a device (a line terminal equipment or, respectively, an intermediate repeater), for example after the replacement of a unit and the loss of the appertaining address connected therewith; or by a personal computer connected to a device within the line section.

The start-addressing telegram occupies the two address bytes with the address 255 that, according to IEC TC 57, has the significance of a multiaddress transmission to all. The instruction itself is contained in what is referred to as an organization byte.

As a reaction to the start-addressing telegram, the addressing line terminal equipment switch into a mode that effects an intermediate storage of all telegrams coming from the interface to other fundamental digital signal line sections. During normal operation, the telegrams are transparently transmitted on the in-service monitoring channel. The individual equipment listen-in in parallel and connect in only when communicating their own telegrams.

A distinction must be made between pure line networks and star networks or, respectively, branching networks in the further execution of the method. Line networks are shown in FIGS. 1 and 2. Star networks are shown in FIGS. 3 and 4.

The method shall be set forth first for a line network. An automatic self-addressing without any manual address setting at all is possible in this case.

As already mentioned, the addressing line terminal equipment switch into the store-and-forward mode after the reception of the start-addressing telegram. The further activities of the addressing line terminal equipment depend on the source of the start-addressing telegram. When the start-addressing telegram is sent from the locating module, then the addressing line terminal equipment wait for the arrival of what are referred to as addressing telegrams. After the start-addressing telegram, the locating module sends an addressing telegram out in a second step, this addressing telegram being constructed in the following way.

Address fields: Line section 255 (multiaddress transmission to all.

Line terminal equipment/intermediate repeater 255 (multiaddress transmission to all)

Organization byte: identifier for addressing telegram Data byte D1: 1 (continuous address of the line section)

Data byte D2: 1(continuous address of the line terminal equipment/intermediate repeater).

As a reaction to this addressing telegram, all line terminal equipment or, respectively, intermediate repeaters accept the content of D1 into their address memory for the line section and accept the content of D2 into the address memory for the line terminal equipment or, respectively, intermediate repeaters. Further, the content of D2 is incremented by every line terminal equipment or, respectively, intermediate repeater and a new addressing telegram with the new D2-content is transmitted. All line terminal equipment or, respectively, intermediate repeaters except the first line terminal equipment receive this second addressing telegram. They accept the content of D1 (=1) as their line section address and accept the content of D2 (=2) as their device address, subsequently increment D2 and transmit a new addressing telegram with the new D2-content. This goes to all line terminal equipment or, respectively, intermediate repeaters with exception of the first line terminal equipment and of the first intermediate repeater.

Figure 10:
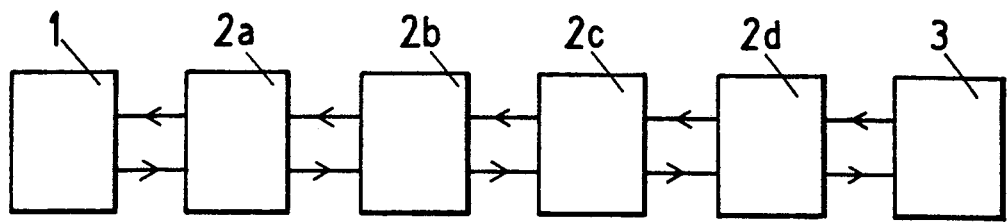
FIG. 10 a line network having a table for the self-addressing of processor units.

The described cycle is initialed continued according to the table of FIG. 10 until the remote line terminal equipment of the first section is reached. The content of D1, i.e. the address of the line section, is incremented in this line terminal equipment and the content of D2, i.e. of the address of the line terminal equipment or, respectively, intermediate repeater, is reset to 1 in this line terminal equipment.

The near line terminal equipment, i.e. the addressing line terminal equipment of the second section now accepts 2 as line section address and 1 as line terminal equipment or, respectively, intermediate repeater address.

The cycle is continued until the remote line terminal equipment of the last section is reached.

After replacing devices, the new units initially have no valid addresses. In this case, a self-addressing is to be implemented that can be restricted to the appertaining line section.

Upon initialization, the replacement device transmits a start-addressing telegram. From the direction of the incoming telegram—from the line in the example under consideration—, the addressing line terminal equipment allocated to the line section recognizes that it should initiate a self-addressing procedure.

It transmits an addressing telegram that contains an identifier in the organization byte that states that re-addressing is to be carried out only within the fundamental digital signal line section. The address of the appertaining line section known to the addressing line terminal equipment resides in byte D1 of this addressing telegram Proceeding from the addressing line terminal equipment, the device address is respectively incremented according to the method already set forth until the remote line terminal equipment is reached. The addressing line terminal equipment of the following line section sees from the content of the organization byte that it dare not forward this addressing telegram.

When the addressing directed to the line section is forgone upon replacement of devices and a re-addressing of the complete (line) network is carried out in this case, then the addressing telegrams need not be intermediately stored in the addressing line terminal equipment.

A pre-setting of the fundamental digital signal line section addresses in the addressing line terminal equipment, for example via switches, coding pins, solder bridges or by inputting via a personal computer, is necessary given a parallel branching of the monitoring network in the case of a star-branch structure.

After the reception of a start-addressing telegram, the addressing line terminal equipment—independently of the source of the start-addressing telegram—transmit addressing telegrams that contain 255 in both address fields as in the case of the line structure. The appertaining line section address resides in the byte D1 of the data field. The byte D2 again contains the continuous addresses for line terminal equipment or, respectively, intermediate repeaters. According to the method already set forth in the case of the line structure, the devices of a line section are addressed with the fixed line section address and with the continuous line terminal equipment or, respectively, intermediate repeater address.

In this operating mode, the addressing line terminal equipment do not forward the addressing telegrams arriving via the interface ISM bus 9.

The prerequisite for the proper functioning of the self-addressing method is that the addressing telegrams are always supplied only into the forward direction of a link—proceeding from the addressing line terminal equipment.

The addressing procedure of a fundamental digital signal line section after the replacement of a line terminal equipment or of an intermediate repeater shall be set forth below.

After the replacement of a line terminal equipment or intermediate repeater and after polling a processor assembly from use, it is advantageous to re-address only all processor units of a single line section because of the loss of address connected therewith. The start of the address allocation within a line section after a processor unit is plugged into use of the line section to be re-addressed and after controlled or automatic enable by the locating module or, respectively, the personal computer in a time slot following the query cycle.

The processor assembly plugged into use sends a control telegram via the terminals K1 through K4 to all processor units in the locating domain. The control telegram is a long telegram having the address 255 (all line sections) in the address field, having the address 255 (all processor units) in the address expansion and having the instruction "switch into monitoring mode" in the organization byte of the data field.

All processor units in normal operation forward a control telegram to the following processor units without intermediate storage. In addition, they check the address field and address expansion of the telegram and switch into the monitoring mode after evaluation of the organization byte.

The processor unit now sends a start-addressing telegram to all processor units of its line section. The start-addressing telegram is a long telegram having the address 255 (all fundamental digital signal line sections) in the address field, having the address 255dec. (all processor units) in the address expansion and having the instruction "start own addressing line terminal equipment for fundamental digital signal line section addressing" in the organization byte of the data field.

An addressing line terminal equipment executes the instruction "start own addressing line terminal equipment for line section addressing" for addressing a line section only when it receives this instruction in a telegram via the terminal K1 or K2. When it receives this instruction in a telegram via the terminal K3 or K4, then it discards this telegram.

After the reception of the start-addressing telegram, the addressing line terminal equipment for addressing a line section generate an addressing telegram having 255 in the address field, 255 in the address expansion, the number of the line section in the third byte of the data field (own line section address) and 001 in the fourth byte of the data field (own processor unit address).

They then send this telegram to the following processor units.

The following processor units in the intermediate repeaters and in the receiving line terminal equipment at the end of every line section receive the addressing telegram via one of the terminals K1, K2. They accept the third data byte of the addressing telegram directly as their own line section address, increment the fourth data byte by 1 and then accept it as their own processor unit address. Subsequently, the content of their own address memory is inserted into the third and fourth data byte of a new addressing telegram and this is forwarded via the terminals K2 of the intermediate repeater or, respectively, K3 of the line terminal equipment to the processor assembly in the same or, respectively, in the next line section.

The processor assemblies in the addressing line terminal equipment for addressing a line section receive the addressing telegrams of a neighboring line section via the terminal K3. They discard these telegrams and do not forward them.

It is a prerequisite for the proper functioning of the method that the addressing telegrams are only forwarded to the next processor unit but are not sent back.

Given manual addressing of the addressing line terminal equipment 1, the addresses in the locating section are set in the following way.

The addresses of the processor unit are composed of two bytes:
  an address byte for the number of the line section in which the processor unit is inserted;
  an address byte for the number of the processor unit 6 within this line section.

In a polling telegram having the transmission protocol of, for example, IEC TC 57, the address field contains the number of the line section 4 and the first data byte (address expansion) in the data field contains the number of the processor unit to be called within this line section.

For initialization of the line equipment, one of the two line terminal equipment 1 at the start or end of every line is lent the function of an addressing line terminal equipment for the addressing phase. This function and a freely selectable line section address are assigned to the addressing line terminal equipment either with the assistance of a coding switch or, respectively, DIP-FIX switch at the processor unit 6, via coding pins in the insert, via the plug strip of the assembly or via its own PC terminal.

So that the number of the line section 4 and the number of the processor unit in the automatic addressing of a locating section are uniformly allocated in a sending sequence—as seen proceeding from the locating module or personal computer—to the process units as addresses, it is advantageous to declare the line terminal equipment of every line that is closer to the locating module or personal computer to be the addressing line terminal equipment.

The processor unit can be switched between two modes for the transmission of the telegrams.
  1. Normal mode: All telegrams incoming at the interfaces are immediately forwarded to the next plug-in devices and are checked in parallel by the microprocessor with respect to their content.
  2. Store-and-forward mode: All telegrams incoming at the interfaces are first checked by the microprocessor with respect to their content before they are forwarded to the next plug-in devices.

The addressing procedure upon initialization of a link having manual addressing of the addressing line terminal equipment sequences in the following way:

After the link configuration, the start of the automatic address allocation for all processor units of a locating region ensues either at the locating module, for example with a key, or at a personal computer 8 via the keyboard thereof. The locating module 7 or the personal computer 8 sends a start-addressing telegram to all processor units of the locating domain.

All processor units are in normal mode. The start-addressing telegram is a long telegram having the address 255 (all line sections 4) in the address field, having the address 255 (all processor units) in the address expansion and having the instructions "switch into the store-and-forward mode" and "begin addressing line terminal equipment addressing" in the organization byte of the data field.

All processor units 6 forward the start-addressing telegram to the following processor units 6 without intermediate storage. In addition, they check the address field and address expansion of the telegram and switch into the store-and-forward mode after checking the organization byte.

After receiving the start-addressing telegram, the addressing line terminal equipment generate an addressing telegram having 255 in the address field, 255 in the address expansion, the number of the line sections 4 in the third byte of the data field (own line section address, referred to below as L-address), and having 001 in the fourth byte of the data field (own processor address, referred to below as P-address). They then send this telegram to the following processor unit.

The following processor units in the intermediate repeaters and in the receiving line terminal equipment at the end of every line section 4 receive the addressing telegram via one of the terminals K1, K2. They directly accept the third data byte of the addressing telegram as their own L-address, increment the fourth data byte by one and then accept it as their own P-address. Subsequently, the content of their address memories is inserted into the third and fourth data byte of a new addressing telegram and this is forwarded via the terminals K1 or K2 at the intermediate repeater or, respectively, K3 at the line terminal equipment to the processor unit in the next line section 4.

The processor units in the transmitting line terminal equipment receive the addressing telegrams via the terminal K3 (start of a line section). They increment the third data byte by one (own L-address), over-write the fourth data byte with 001 (own P-address) and then accept it into the address memory. Subsequently, the content of their own address memories is placed into the third and fourth data byte of a new addressing telegram and this is forwarded to the next processor unit.

The processor unit in the addressing line terminal equipment receive the addressing telegram of a neighboring line section 4 via the terminal K3.

They discard these telegrams and do not forward them.

It is a prerequisite for the proper functioning of the method that the addressing telegrams are only forwarded to the next processor unit 6 but are not sent back.

The addressing procedure of a line after the replacement of a line terminal equipment or intermediate repeater having manual addressing of the addressing line terminal equipment sequences in the following way:

After the replacement of an addressing line terminal equipment, the device has its L-address assigned to it either with the assistance of a coding switch or, respectively, DIP-FIX switch at the processor unit, via coding pins in the insert, via the plug strip of the assembly or via its own PC terminal.

After the replacement of a receiving line terminal equipment or, respectively, intermediate repeater or after pulling a processor unit belonging to these devices from the insert, it is advantageous to re-address only all processor units of line because of the address loss connected therewith. The start of the address allocation within a line ensues after plugging a processor unit into the insert of the line to be re-addressed and after automatic enable by the locating module or, respectively, the personal computer in a time slot after a polling cycle.

The processor assembly plugged into the insert sends a control telegram in this time slot via the terminals K1, K2 and K3 to all processor units and to the locating module or, respectively, to the personal computer in the locating domain. The control telegram is a long telegram having the address 255 (all line sections 4) in the address field, having the address 255 (all processor units) in the address expansion, and having the instruction "switch into the store-and-forward mode" in the organization byte of the data field.

All processor units in the normal mode forward a control telegram to the following processor units without intermediate storage. In addition, they check the address field and address expansion of the telegram and switch into the store-and-forward mode after evaluating the organization byte.

After the reception of a control telegram, the locating module or the personal computer releases a time slot that is adequate for the addressing procedure.

The processor unit now sends a start-addressing telegram to the processor units of its line section.

The start-addressing telegram is a long telegram having the address 255 (all line sections 4) in the address field, having the address 255 (all processor units) in the address expansion, and having the instruction "begin own addressing line terminal equipment addressing" in the organization byte of the data field.

An addressing line terminal equipment executes the instruction "begin own addressing line terminal equipment addressing" only when it receives this instruction in a telegram via the terminal K1, K2. When it receives this instruction in a telegram via the terminal K3, it discards this telegram.

After the reception of the start-addressing telegram, the addressing line terminal equipment generate an addressing telegram having 255 in the address field, having 255 in the address expansion, having the number of the line sections in the third byte of the data field (own L-address) and having 001 in the fourth byte of the data field (own P-address).

They then send this telegram to the following processor unit.

The following processor units in the intermediate repeaters and in the receiving line terminal equipment at the end of every line section receive the addressing telegram via one of the terminals K1, K2. They directly accept the third data byte of the addressing telegram as own L-address, increment the fourth data byte by one and then accept it as their own P-address. Subsequently, the content of their own address memories is inserted into the third and fourth data byte of a new addressing telegram and this is forwarded via the terminals K1, K2 at the intermediate repeater or, respectively, K3 at the line terminal equipment to the processor assembly in the next line section 4.

The processor units in the transmitting line terminal equipment receive the addressing telegrams via the terminal K3 (start of a line section 4). They increment the third data byte by one (own L-address), over-write the fourth data byte with 001 (own P-address), and then accept it into the address memories. Subsequently, the content of their own address memories is introduced into the third and fourth data byte of a new addressing telegram and this is forwarded to the next processor unit.

The processor units in the addressing line terminal equipment receive the addressing telegrams of a neighboring line section 4 via the terminal K3. They discard these telegrams and do not forward them.

It is a prerequisite for the proper functioning of the method that the addressing telegrams are only forwarded to the next processor unit but are not sent back.

In the methods set forth up to now, the address of the addressing line terminal equipment must be set with coding pins or by input with a personal computer on site given a branching or, respectively, network node. An automatic setting of the L-address is also possible when a cascade circuit for the branching devices is utilized instead of a network node having parallel connection.

FIG. 7 shows the block circuit diagram of a processor assembly having the two terminals K3 and K4 or, respectively, K3a and K4a for the cascade circuit of a branching. Bidirectional buses are thereby to be connected to the two terminals K3 and K4 and/or four-wire buses are to be connected to the terminals K3a and K4a.

Figure 5:
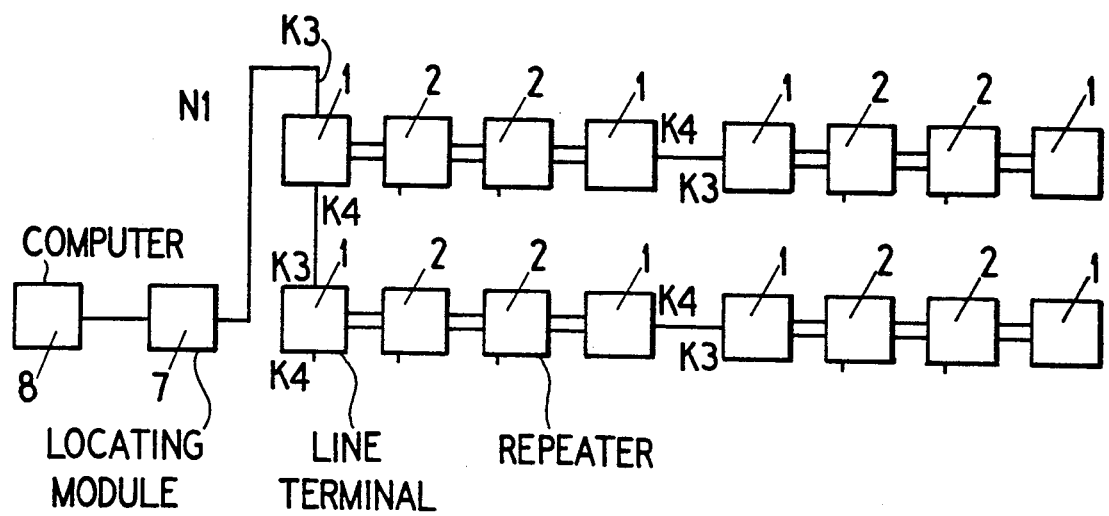
FIG. 5 a telegram transmission network having a cascade circuit.
Figure 6:
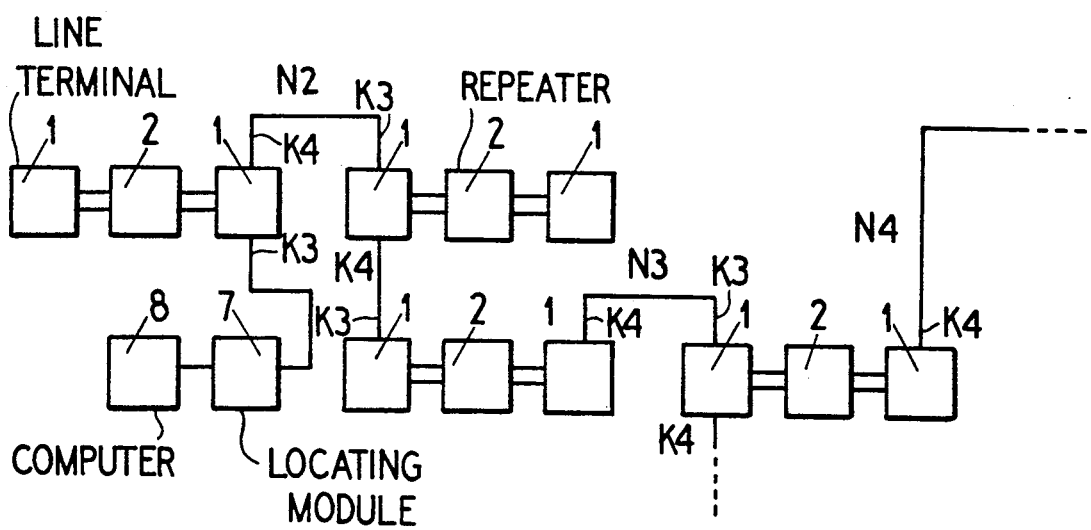
FIG. 6 a telegram transmission network having a plurality of circuits.

Examples of the cascade circuit upon employment of the terminals K3 and K4 are recited in FIGS. 5 and 6. FIG. 5 thereby shows a network having parallel lines and FIG. 6 shows a network having tree structure.

In the addressing, the first device at every branching becomes an addressing line terminal equipment with its own L-address. Every processor unit of a line section 4 has the same L-address and its own P-address.

The following procedure is provided for the execution of the addressing:

Input of the network structure into the locating module 7 via the personal computer 8.

Via an interactive method, the network structure—plurality of network nodes, plurality of branchings with a respective addressing line terminal equipment at every network node, plurality of processor units in every line section 4—is input at the picture screen of the personal computer.

After the link configuration, the start of the automatic address allocation for all processor units of a locating domain ensues either at the locating module with a key or at a personal computer via the keyboard thereof.

All processor units are in normal mode.

The locating module or the personal computer sends a control telegram to all processor units of the locating domain. The control telegram is a long telegram having the address 255 (all line sections 4) in the address field, having the address 255 (all processor units) in the address expansion and having the instruction "switch into the store-and-forward mode" in the organization byte of the data field.

All processor units forward the control telegram to the following processor units without intermediate storage. In addition, they check the address field and address expansion of the telegram and switch into the store-and-forward mode after checking the organization byte.

The locating module or the personal computer now sends a start-addressing telegram to the first, transmitting line terminal equipment via the terminal K3 of the first network node. The start-addressing telegram is a long telegram having 255 in the address field, having 255 in he address expansion, having the number of the line section in the third byte of the data field (assigned L-address), having 001 in the fourth data byte of the data field (P-address) and having the instruction "begin addressing line terminal equipment address" in the organization byte of the data field. As a result of this telegram, this line terminal equipment becomes an addressing line terminal equipment. The addressing line terminal equipment accepts the third data byte and fourth data byte into its address memory and sends the start-address telegramming with a content of the third data byte incremented by one via its terminal K4 to the next, transmitting line terminal equipment via the terminal K2 of the network node, etc.

After the reception of the start-addressing telegram, the addressing line terminal equipment at the first network node generate an addressing telegram having 255 in the address field, 255 in the address expansion, the number of the line section in the third byte of the data field (own L-address) and 001 in the fourth byte of the data field (own P-address). They then send this telegram via the terminal K1, K2 to the following processor unit.

The following processor units in the intermediate repeaters and in the receiving line terminal equipment at the end of every line section 4 receive the addressing telegram via one of the terminals K1, K2. They directly accept the third data byte of the addressing telegram as their own L-address, increment the fourth data byte by one and then accept it as their own P-address.

The receiving line terminal equipment forwards no addressing telegrams via its terminals K1, K2.

The locating module or the personal computer now successively polls the receiving line terminal equipment that are now being addressed with their address, these being connected at their terminal K4 to a further line section 4 and initiates them to send a start-addressing telegram with the previously defined L-address to their first, transmitting line terminal equipment.

The addressing of the transmitting line terminal equipment and of the processor units in the line sections of the next network node ensues analogously to the addressing of the first network node.

It is a prerequisite for the proper functioning of the method that the addressing telegrams are only forwarded to the next processor unit but are not sent back.

The addressing procedure of a line section 4 after the replacement of a line terminal equipment or intermediate repeater with automatic addressing of the addressing line-terminal equipment sequences in the following way:

After the replacement of an addressing line terminal equipment, the L-addresses are re-addressed.

The start of the address allocation ensues after the plugging of the new insert and after automatic enable by the locating module or, respectively, the personal computer in a time slot after a polling cycle.

The processor assembly of the new insert sends a request telegram to the locating module or to the personal computer in this time slot.

The request telegram is a long telegram having the address 255 (all line sections) in the address field, having the address 255 (all processor units) in the address expansion, and having the instruction "re-addressing of the line sections" in the organization byte of the data field.

The re-addressing of the line section is started after the reception of this telegram by the locating module or the personal computer.

The locating module or the personal computer sends a control telegram to all processor units of the locating domain. The control telegram is a long telegram having the address 255 (all line sections) in the address field, having the address 255 (all processor units) in the address expansion and having the instruction "switch into the store-and-forward mode" in the organization byte of the data field.

All processor units forward the control telegram to the following processor units without intermediate storage. In addition, they check the address field and address expansion of the telegram and switch into the store-and-forward mode after checking the organization byte.

The locating module or the personal computer now sends a start-addressing telegram to the first, transmitting line terminal equipment (terminal K3) of the first network node. The start-addressing telegram is a long telegram having 255 in the address field, section in the third byte of the data field (assigned L-address), 001 in the fourth data byte of the data field (P-address) and the instruction "being addressing line terminal equipment addressing" in the organization byte of the data field. This line terminal equipment becomes an addressing line terminal equipment as a result of this telegram.

The addressing line terminal equipment accepts the third data byte and the fourth data byte into its address memory and sends the start-address telegramming with a content of the third data byte incremented by one via its terminal K4 to the next addressing line terminal equipment (terminal K3) of the network node, etc.

After the replacement of a receiving line terminal equipment or, respectively, intermediate repeater or after polling a processor assembly belonging to one of these devices from the insert, it is advantageous to only re-address all processor units of a line section because of the address loss connected therewith.

The start of the address allocation within a line section ensues after the plugging of a processor unit into the insert of the line section to be re-addressed and after automatic enable by the locating module or, respectively, by the personal computer in a time slot after a polling cycle.

In this time slot, the processor assembly plugged into the insert sends a control telegram via the terminals K1, K2, K3 and K4 to all processor units and to the locating module or, respectively, to the personal computer in the locating domain. The control telegram is a long telegram having the address 255 (all line sections) in the address field, having the address 255 (all processor units) in the address expansion, and having the instruction "switch into the store-and-forward mode" in the organization byte of the data field.

All processor units in normal mode forward a control telegram to the following processor units without intermediate storage. In addition, they check the address field and address expansion of the telegram and switch into the store-and-forward mode after the evaluation of the organization byte.

After receiving the control telegram, the locating module or, respectively, the personal computer releases a time slot that is adequate for the addressing procedure.

The processor unit now sends a start-addressing telegram to the processor units of its line section.

The start-addressing telegram is a long telegram having the address 255 (all line sections) in the address field, having the address 255 (all processor units) in the address expansion, and having the instruction "begin own addressing line terminal equipment addressing" in the organization byte of the data field.

An addressing line terminal equipment executes the instruction "start own addressing line terminal equipment address" only when it receives this instruction in a telegram via the terminal K1, K2. When it receives this instruction in a telegram via terminal K3, K4, it discards this telegram After the reception of the start-addressing telegram, the addressing line terminal equipment generate an addressing telegram having 255 in the address field, 255 in the address expansion, the number of the line section in the third byte of the 10 data field (own L-address) and 001 in the fourth byte of the data field (own P-address). They then send this telegram to the following processor units.

The following processor units in the intermediate repeaters and in the receiving line terminal equipment at the end of every line section receive the addressing telegram via one of the terminals K1, K2. They directly accept the third data byte of the addressing telegram as their own L-address, increment the fourth data byte by one and then accept it as their own P-address. Subsequently, the content of their own address memories is inserted into the third and fourth data byte of a new addressing telegram and this is forwarded via the terminals K1, K2 to the processor assembly in the next intermediate repeater. The addressing procedure is concluded when the receiving line terminal equipment of this line section is addressed. The addressing telegram is only forwarded within the line section 4 via the terminals K1, K2.

It is a prerequisite for the proper functioning of the method that the addressing telegrams are only forwarded to the next processor unit but are not sent back.

In the described instances, a manual, local address input via a personal computer connected to the processor unit is possible in addition to the automatic address generating.

FIGS. 7 through 9 show three types of processor units in terms of their fundamental principle. The processor unit shown in FIG. 7 has the advantage that it unites these three types.

The processor unit shown in FIG. 7 has two four-wire terminals K1, K2 and the two bidirectional bus terminals K3, K4 for the transmission of telegrams. It can thus be utilized both in the line terminal equipment 1 as well as in an intermediate repeater 2.

The four-wire terminal K1 has an input E1 and an output A1 for the connection of a first four-wire data channel; the terminal K2 has an input E2 and an output A2 for a second four-wire data channel; the terminal K3a has an input E3 and an output A3 for the connection of a third four-wire data channel; and the connection K4a has an input E4 and an output A4 for the connection of a fourth four-wire data channel.

The transmission-reception module 10 lies between the four-wire terminal pair E3, A3 and the bus terminal K3, i.e. between the terminals K3a and K3, for the connection of a first bidirectional bus. The control input of this transmission and reception module 10 via which the driver D serving as transmitter can be activated is connected to the output of the OR element 15.

The transmission-reception module 40 that is composed of the driver D and of the receiver R lies between the four-wire terminal pair E4, A4 and the bus terminal K4, i.e. between the terminals K4a and K4, for the connection of a second bidirectional bus. The control input of this transmission and reception module 40 via which the driver D can be activated is connected to the output of the OR element 45. The receiver R is constantly activated.

Via a switch-over means 13, 19, 43 or, respectively, 37 controllable by the microprocessor 35, each of the four outputs A1, A2, A3, A4 can be optionally connected to the output of an OR element 11, 17, 41, 39, to a poll-resistor 12, 18, 42 or, respectively, 38 or to the output of the parallel-to-serial converter 26. This parallel-to-serial converter 26 has its parallel input connected to the port PO of the microprocessor 35.

The microprocessor 35 controls the switch-over means 13 via the two-lead control line St4, controls the switch-over means 19 via the two-lead control line St1, controls the switch-over means 43 via the two-lead control line St8 and controls the switch-over means 37 via the two-lead control line St7.

The outputs of the OR elements 11, 17, 41, 39 lead via the switch-over means 13, 19, 43, 37 to respectively one of the outputs A1, A2, A3, A4. Their inputs are respectively connected to the inputs of three other four-wire terminal pairs.

The switch 16 is inserted in the connecting line between the input E3 and the inputs of the OR elements 17, 41, 39. The control line of the switch 16 is connected to the output of the OR element 15.

The switch 46 is inserted in the connecting line between the input E4 and the inputs of the OR elements 11, 17, 39. The control line of the switch 46 is connected to the output of the OR element 45.

The output of the OR element 11 is conducted to an input of the OR element 15 via the means 14a for signal edge recognition and via the timer circuit 14b connected in chain therewith. The other input of the OR element 15 is connected to the control line St3 coming from the microprocessor 35. The control input of the devices 14a, 14b is connected to the control line St5 coming from the microprocessor 35.

The output of the OR element 41 is conducted to an input of the OR element 45 via the means 44a for signal edge recognition and via the timer circuit 44b connected in chain therewith. The other input of the OR element 45 is connected to the control line St10 coming from the microprocessor 35. The control input of the devices 44a, 44b is connected to the control line St9 coming from the microprocessor 35.

The inputs E1, E2, E3, E4 are each respectively connected to an input of one of the serial-to-parallel converters 24, 25, 27, 28. The outputs of the serial-to-parallel converters 24, 25, 27, 28 are connected to the microprocessor 35 via the 8-bit parallel bus 31. The signal collector 20 is likewise coupled to the bus 31, mainly via the interface module 21 to the serial-to-parallel converter 22 and to the parallel-to-serial converter 23.

The serial-to-parallel converters 22, 24, 25, 27, 28 as well as the parallel-to-serial converters 23, 26 are contained in UART modules and, as needed, interrupt the program of the microprocessor 35 via the interrupt module 30 connected to the interrupt input Int O. They are connected via the bus 31 to the port PO of the microprocessor 35 and are selected by the microprocessor 35 via the chip select module 29.

The coding switch 51 is also connected to the port PO of the microprocessor 35 via the switch 50 with whose assistance the processor unit can be set to an address and to the function of an addressing-LE.

The RAM 32 serving as data store, the EPROM 33 serving as program store, the EEPROM 34 serving as non-volatile data store and the module 36 for self-monitoring are also connected to the microprocessor 35.

The data transmission in the normal mode sequences in the following way:

The telegrams from the input E1, E3 or E4 are directly forwarded via the OR element 17 and the switch-over means 19 to the output A2. Data from the input E3 additionally traverse the switch 16; data from the input E4 additionally traverse the switch 46.

Data that arrive at the input E2, E3 or E4 proceed via the OR element 39 and via the switch-over means 37 to the output A1. Data from the input E3 additionally traverse the switch 16; data from the input E4 additionally traverse the switch 46.

Data that arrive at the input E1, E2 or E4 proceed via the OR element 11 and via the switch-over means 13 to the driver D of the transmission-reception module 10 and proceed from the latter to the bus terminal K3. To this end, the switch-over means 13 must be in the illustrated, normal position and the driver D must be activated. The driver D is activated when the means 14a recognizes a leading edge and the OR element 15 receives a corresponding control potential from the microprocessor 35 via the means 14a, 14b and/or via the control line St3.

When, in normal mode, data are conducted via the OR element 11 to the bus terminal K3, then these data are also supplied into the means 14a for signal edge recognition.

When the means 14a for signal edge recognition recognizes the leading edge of the first bit of a telegram, then it starts the timer circuit 14b. This timer circuit outputs an output pulse that is independent of the bit sequence that arrives at the input of the means 14a for signal edge recognition. The output pulse proceeds via the OR element 15 to the transmission-reception module 10 and immediately activates the driver D. Data that arrive at one of the inputs E1, E2 or E4 are thus immediately forwarded to the bus terminal K3 on the basis of the recognition of a leading edge. The data transmitted at the bus terminal K3 are received by the receiver R but are inhibited in the switch 16 opened by the OR element 15.

Data that arrive at the input E1, E2 or E3 proceed via the OR element 41 and via the switch-over means 43 to the driver D of the transmission-reception module 40 and proceed from the latter to the bus terminal K4. To this end, the switch-over means 43 must be in the illustrated, normal position and the driver D must be activated. The driver D is activated when the OR element 45 receives a corresponding control potential from the microprocessor 35 via the means 44a, 44b and/or via the control line St10.

When, in normal mode, data are conducted via the OR element 41 to the bus terminal K4, then these data are also supplied into the means 44a for signal edge recognition. When the means 44a for signal edge recognition recognizes the leading edge of the first bit of a telegram, then it starts the timer circuit 44b. This timer circuit outputs an output pulse that is independent of the bit sequence that arrives at the input of the means 44a for signal edge recognition. The output pulse proceeds via the OR element 45 to the transmission-reception module 40 and immediately activates the driver D. Data that arrive at one of the inputs E1, E2 or E3 of a processor unit 6 are thus immediately forwarded to the bus terminal K4 due to the recognition of a leading edge. The data transmitted at the bus terminal K4 are received by the receiver R but are inhibited in the switch 46 opened by the OR element 45.

All data that arrive at the inputs E1, E2, E3, E4 are forwarded microprocessor 35 for processing. Data that arrive at the input E1 proceed to the microprocessor 35 via the serial-to-parallel converter 25; data from the input E2 proceed to the microprocessor 35 via the serial-to-parallel converter 25; data from the input E3 proceed to the microprocessor 35 via the serial-to-parallel converter 24; and data from the input E4 proceed to the microprocessor 35 via the serial-to-parallel converter 28.

The serial-to-parallel converters 24, 25, 27, 28 accept the data byte-by-byte and always send an interrupt pulse to the microprocessor 35 via the interrupt module 30 when a byte has been completely read in, this byte satisfies the start, stop and parity conditions and when it can be accepted at the port PO by the microprocessor 35 via the bus 31.

When the microprocessor 35 finds that the data from the inputs E1, E2 or E4 satisfy prescribed demands, then it activates the control line St3. As a result thereof, the microprocessor 35 activates the driver D in the interface or, respectively, transmission-reception module 10 via the OR element 15 after the expiration of the time span prescribed by the timer circuit 14b.

When the microprocessor 35 finds that the data from the inputs E1, E2 or E3 satisfy prescribed demands, it activates the control line St10. As a result thereof, the microprocessor 35 undertakes the activation of the driver D in the interface module 40 via the OR element 45 after the expiration of the time span prescribed by the timer circuit 44b.

In normal mode, data dare be transmitted simultaneously via only one of the inputs E1, E2, E3, E4; otherwise, these are superimposed in the OR elements 11, 17, 41, 39 and are thus falsified.

On the basis of an instruction "switch into the store-and-forward mode" in the control telegram of the personal computer 8, the processor unit can be initiated to switch into the store-and-forward mode.

The control telegram having the instruction "switch into the store-and-forward mode" passes through all processor in the normal mode. Parallel thereto, the microprocessor 35 in every processor unit respectively processes the control telegram and switches into the store-and-forward mode after the evaluation thereof.

When, in the evaluation of a telegram, the microprocessor 35 finds that given demands have not been satisfied, then it initiates the processor unit to switch into a store-and-forward mode.

In the store-and-forward mode, the data that pend at the inputs E1, E2, E3, E4 are supplied to the microprocessor for processing via the serial-to-parallel converters 24, 25, 27, 28. After the processing, the microprocessor 35 activates one through three of control lines St1, St4, St7, St8 in conformity with the method dependent on the type of telegram. As a result thereof, the data processed in the microprocessor 35 that the parallel-to-serial converter 26 outputs proceed via one through three of the switch-over means 13, 19, 43, 47 to one through three of the outputs K1, K2, K3 and K4, namely only to outputs of the terminals at which the telegram was not received.

Each input E1, E2, E3, E4 is connected to its own serial-to-parallel converter 24, 25, 27, 28. On the basis of the interrupt pulses, the microprocessor 35 recognizes via which of the inputs data are supplied.

The control lines St1, St4, St7, St8 are activated such by the microprocessor that those outputs A1, A2, A3, A4 via which transmission was not carried out are placed at high potential via the switch-over means 13, 19, 43, 47 with the assistance of the poll-resistors 12, 18, 42, 48.

The start-addressing telegrams pass through all processor units in the normal mode. Parallel thereto, the microprocessor 35 respectively processes the start-addressing telegrams and switches into the store-and-forward mode.

During addressing, the addressing telegram dare only be forwarded by the processor via the parallel-to-serial converter 25 and dare not be simultaneously transmitted in both directions. The data incoming at the input E1 are processed in the serial-to-parallel converter 23; the data incoming at the input E2 are processed in the serial-to-parallel converter 27. The microprocessor 35 thus recognizes the direction from which the data come. In the store-and-forward mode, thus, the control lines St1, and the control lines St7 are activated such that the output A1 or A2 via which transmission is not being carried out is placed at high potential via the switch-over means 19 and 47 and the poll-up resistor 18 or, respectively, 48.

The signal collector 20 is connected to the microprocessor 35 via the interface module 21 and via the serial-to-parallel converter 22 and the parallel-to-serial converter 23.

Via the interface module 21, the signal collector 20 supplies the monitoring data of the monitored intermediate repeater of the monitored line terminal equipment to the microprocessor 35 and may receive the control information contained in a polling telegram of the locating module for forwarding to a signal collecting means (not shown).

Dependent upon employment of the processor unit in the line terminal equipment or in the intermediate repeater, the monitoring data are transmitted from the processor 35 via the parallel-to-serial converter 26, via three of four switch-over means 13, 19, 43, 47 to three of four outputs A1, A2, A3, A4 and are transmitted via three of four-terminals K1, K2, K3, K4.

When a plurality of terminals K3 are connected to one another by a bidirectional bus at a network node, then the following sequence derives for the activation and deactivation of a bus driver:

All drivers are inactive in the quiescent condition and have a high-impedance output. When data arrive at the terminal K1 or K2, the timer element 14b is started by the signal edge of the start bit, this terminal element 14b activating the driver for at least two characters. Further holding and deactivation are then assumed by the microprocessor 35 to which the data were supplied in parallel.

The processor unit shown in FIG. 8 largely agrees with that of FIG. 7. In a departure, no bus terminal K4 is provided. Omitted together with that are the switch means 40, 41, 42, 43, 44a, 44b, 45, 46 and 28. The double exclusive-OR elements 11a, 17a and 39a are provided instead of the triple OR-elements 11, 17 and 9 in FIG. 7.

The output of the exclusive-OR element 11a is conducted to the one input of the OR element 15 via the means 14a for signal edge recognition and via the input of the OR element 15, together with a control input of the means 14a and 14b, is connected to the control line St3 coming from the microprocessor 35.

As in FIG. 7, the control input of the transmission and reception module 10 is connected to the output of the OR element 15. In a departure from FIG. 7, the driver D or the receiver R can be selectively activated with the assistance of the control signal applied to the control input. The output pulse proceeds via the OR element 15 to the transmission-reception module 10 and immediately activates the driver D and deactivates the receiver R.

In the normal mode, the telegrams from the data input E1 are directly forwarded to the output A2 via the exclusive-OR element 17a and via the switch-over means 19. In the return direction, the telegrams proceed from the input E2 via the exclusive-OR element 39a and the switch 37 to the output A1.

The exclusive-OR element 11a, 17a or, respectively, 39a sees to it that no data are transmitted when data arrive simultaneously at the inputs E1 and E2 or, respectively, E1 and E3 or, respectively, E2 and E3. Since no data dare arrive simultaneously at the input E1, E2 and E3 given error-free operation, data are inhibited by the exclusive-OR elements 11a, 49a and 17a only in case of error.

The processor unit shown in FIG. 9 largely coincides with that of FIG. 8. In a departure, no bus terminal K3 is provided. Lacking together with it are the switch means 10, 11a, 12, 14a, 14b, 15, 17a, 39a and 24. The processor unit is intended for employment in an intermediate repeater and, in addition to the four-wire terminals K1 and K2, has only one terminal for the local signal collector 20.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

We claim:

1. Method for addressing processor units of a means for monitoring and/or controlling communication transmission equipment in a communication transmission network having a plurality of transmission sections, the means for monitoring and/or controlling also having a monitoring unit and processor units, the monitoring unit and the processor units exchanging information with one another during normal operation of the communication transmission equipment via the communication transmission network, the processor units being provided with addresses, comprising the steps of:

forming the telegram transmission network with a plurality of transmission sections, each of the transmission sections having first and second line terminal devices and at least one intermediate repeater device;

providing units at respective operating locations of the devices in the communication transmission equipment, a processor unit located at an end of a respective transmission section being an address unit;

providing at least one in-service monitoring channel in the communication transmission equipment, the in-service monitoring channel covering a plurality of transmission sections of the telegram transmission network;

providing a start-addressing telegram to the addressing unit;

in response to the start-addressing telegram the addressing unit switching from the normal operating mode to a store-and-forward mode wherein the addressing unit effects an intermediate storage of all incoming telegrams;

providing an addressing telegram to the addressing unit, the addressing telegrams containing at least a first sub-address of the respective transmission section of the addressing unit and a second sub-address;

each process unit receiving the addressing telegram on the inservice monitoring channel, storing the first sub-address and a second sub-address as its own address, incrementing the second subaddress and forming a new addressing telegram, and sending the new addressing telegram on the in-service monitoring channel to a next processor unit.

2. The method according to claim 1, wherein given a plurality of transmission sections connected in chain, the processor unit that is situated at that end of the transmission section lying opposite the addressing unit or the first processor unit of a following transmission section increments both the first as well as the second sub-address.

3. The method according to claim 1, wherein given a plurality of transmission sections connected in chain, the processor unit that is situated at that end of the transmission section lying opposite the addressing unit or the first processor unit of a following transmission section increments the first sub-address and resets the second sub-address to an initial value.

4. Method for addressing processor units of a means for monitoring and/or controlling a communication transmission equipment, whereby at least one monitoring unit it and processor units, the processor units having respective addresses, exchange information with one another during normal operation via a telegram transmission network such that answer back telegrams containing polling telegrams and monitoring data of the communication transmission equipment are transmitted to the processor units, comprising the steps of:

forming the telegram transmission network with a plurality of transmission sections, each of the transmission sections having first and second line terminal devices and at least one intermediate repeater device;

providing processor units at respective operating locations of the devices in the communication transmission equipment;

providing at least one in-service monitoring channel in the communication transmission equipment, the in-service monitoring channel covering a plurality of transmission sections of the telegram transmission network;

providing in each address of the processor units a first sub-address for the respective transmission section and a second sub-address for the ordering number of the respective processor unit in the respective transmission section;

a processor unit connected to one of two ends of the respective transmission section and serving as an addressing unit in an addressing mode outputting an addressing telegram that contains the first sub-address of the respective transmission section; and the processor units of the respective transmission section forwarding a new addressing telegram after an incrementation of the second sub-address contained in the addressing telegram; and each processor unit of the transmission section respectively storing one of the respective address of the received addressing telegrams and the respective address of the transmitted telegram as its own address.

5. The method according to claim 4, wherein given a plurality of transmission sections connected in chain, the processor unit that is situated at that end of the transmission section lying opposite the addressing unit or the first processor unit of a following transmission section increments both the first as well as the second sub-address.

6. The method according to claim 4, wherein given a plurality of transmission sections connected in chain, the processor unit that is situated at that end of the transmission section lying opposite the addressing unit or the first processor unit of a following transmission section increments the first sub-address and resets the second sub-address to an initial value.

7. The method according to claim 4, wherein the telegram transmission network is a star network having a structure composed of a plurality of line networks each respectively containing at least one transmission section; and wherein addressing units situated at nodes of the star network are respectively pre-set to a given address in the first address part and, given reception of a start-addressing telegram, output an addressing telegram that is the pre-set address of the appertaining transmission section in the first address part and is its own ordering number in the appertaining transmission section in the second address part.

8. The method according to claim 4, wherein the processor unit in a first operating mode, (normal mode), through-connects telegrams and, in a second operating mode (store-and-forward mode), does not forward telegrams until after a storing of the telegrams.

9. The method according to claim 4, wherein at least two processor units connected in cascade are provided at a network node of the telegram transmission network.

10. The method according to claim 9, wherein the telegram transmission network is a star network having a structure composed of a plurality of line networks each respectively containing at least one transmission section; and wherein, after the reception of an addressing telegram processor units situated at nodes of the network can be set to an address by the first sub-address and, given reception of a start-addressing telegram, output an addressing telegram that is the set address of the appertaining transmission section in the first sub-address and is its own ordering number in the appertaining transmission section in the second sub-address.

11. The method according to claim 4, wherein when a processor unit is replaced in the transmission communication equipment, the processor units are switched into a condition wherein they transmit a request telegram during a time slot respectively provided following the polling cycle, as a result whereof the respectively at located addressing unit is initiated to send out and addressing telegram.

12. The method according to claim 11, wherein give the replacement of a processor unit that is not an addressing unit, the monitor unit is initiated by a request telegram to lend the time slot a duration adequate for the addressing procedure.

13. Method for addressing processor units of a means for monitoring and/or controlling communication transmission equipment in a communication transmission network having a plurality of transmission sections, the means for monitoring and/or controlling also having a monitoring unit and processor units, the monitoring unit and the processor units exchanging information with one another during normal operation of the communication transmission equipment via the communication transmission network, the processor units being provided with addresses, comprising the steps of:

forming the telegram transmission network with a plurality of transmission sections, each of the transmission sections having first and second line terminal devices and at least one intermediate repeater device;

providing processor units at respective operating locations of the devices in the communication transmission equipment, a processor unit located at an end of a respective transmission section being an address unit;

providing at least one in-service monitoring channel in the communication transmission equipment, the in-service monitoring channel covering a plurality of transmission sections of the telegram transmission network;

upon replacement of a device in the communication transmission equipment, the processor unit of the replaced device transmitting a start-addressing telegram on the in-service monitoring channel of the associated transmission section;

upon receiving the start-addressing telegram the addressing unit transmitting an addressing telegram on the in-service monitoring channel, the addressing telegram containing at least a first sub-address of the associated transmission section and a second sub-address having an initial value that is the address of the address unit;

each processor unit receiving the address telegram on the in-service monitoring channel, incrementing the second sub-address, storing the first sub-address and incremented second sub-address as its own address, forming a new addressing telegram with the first sub-address and the incremented second sub-address, and sending the new address telegram on the in-service monitoring channel to a next processor unit.

14. The method according to claim 13, wherein given the replacement of a processor unit that is not an addressing unit, the monitor unit is initiated by a request telegram to lend a time slot a duration adequate for the addressing procedure.

* * * * *